(12) United States Patent
Sakurada et al.

(10) Patent No.: US 10,752,263 B2
(45) Date of Patent: Aug. 25, 2020

(54) VEHICULAR COOLING DEVICE

(71) Applicant: MITSUBISHI ELECTRIC CORPORATION, Chiyoda-ku, Tokyo (JP)

(72) Inventors: Tetsuya Sakurada, Tokyo (JP); Kenichi Nakagawa, Tokyo (JP); Kazuki Iwasa, Tokyo (JP); Seiji Haga, Tokyo (JP)

(73) Assignee: MITSUBISHI ELECTRIC CORPORATION, Chiyoda-Ku, Tokyo (JP)

( * ) Notice: Subject to any disclaimer, the term of this patent is extended or adjusted under 35 U.S.C. 154(b) by 45 days.

(21) Appl. No.: 16/077,505

(22) PCT Filed: Feb. 29, 2016

(86) PCT No.: PCT/JP2016/056037
§ 371 (c)(1),
(2) Date: Aug. 13, 2018

(87) PCT Pub. No.: WO2017/149594
PCT Pub. Date: Sep. 8, 2017

(65) Prior Publication Data
US 2019/0039630 A1 Feb. 7, 2019

(51) Int. Cl.
*B60H 1/00* (2006.01)
*B61C 17/00* (2006.01)
(Continued)

(52) U.S. Cl.
CPC ......... *B61C 17/00* (2013.01); *B60H 1/00371* (2013.01); *B60H 1/00428* (2013.01);
(Continued)

(58) Field of Classification Search
CPC ........ B60K 11/08; B60K 11/06; B60K 11/085
(Continued)

(56) References Cited

U.S. PATENT DOCUMENTS 1,950,792 A * 3/1934 Green ................ F01P 7/10
165/98
4,325,283 A * 4/1982 Bemiss ................ F41H 7/035
180/68.6
(Continued)

FOREIGN PATENT DOCUMENTS

EP 0577895 A 1/1994
JP 51092807 U 7/1976
(Continued)

OTHER PUBLICATIONS

Office Action (Notification of Reasons for Refusal) dated Mar. 19, 2019, by the Japanese Patent Office in corresponding Japanese Patent Application No. 2018-502868 and English translation of the Office Action. (10 pages).
(Continued)

*Primary Examiner* — Jeffrey J Restifo
(74) *Attorney, Agent, or Firm* — Buchanan Ingersoll & Rooney PC

(57) ABSTRACT

A vehicular cooling device includes an opening, a discharge port, an air channel, and a fan. The opening is formed in a surface parallel to a travelling direction of a vehicle. The discharge port is formed in a surface of the housing and connected to the opening via the air channel. The fan is provided inside the air channel. First blockers are spaced apart in the travelling direction in the opening. Each first blocker extends in a direction perpendicular to both the travelling direction and an inflow direction of the outside air, and includes first and second members. The first member is a plate-like member having a main surface intersecting the travelling direction. The first member and the second member are symmetric with respect to a plane perpendicular to the travelling direction, and have a travelling-direction spac-
(Continued)

ing therebetween that increases along the inflow direction of the outside air.

20 Claims, 22 Drawing Sheets

(51) Int. Cl.
  *B60H 1/24* (2006.01)
  *H02K 9/06* (2006.01)
(52) U.S. Cl.
  CPC .............. *B60H 1/248* (2013.01); *H02K 9/06* (2013.01); *B60L 2200/26* (2013.01)
(58) Field of Classification Search
  USPC ....................................................... 180/68.1
  See application file for complete search history.

(56) References Cited

U.S. PATENT DOCUMENTS

| | | | | |
|---|---|---|---|---|
| 4,410,032 A * | 10/1983 | Mori | ..................... | B60K 11/085 123/41.06 |
| 5,046,406 A * | 9/1991 | Harris | ..................... | F24F 1/027 454/202 |
| 6,041,878 A * | 3/2000 | Daniels | .................. | B60K 11/08 180/68.6 |
| 6,101,836 A * | 8/2000 | Yamada | ............. | B60H 1/00371 454/104 |
| 6,230,832 B1 * | 5/2001 | von Mayenburg | .... | B60K 11/08 180/68.1 |
| 6,527,333 B2 * | 3/2003 | Hewitt | ................... | B60K 11/08 180/68.6 |
| 7,717,208 B2 * | 5/2010 | Knauer | ................ | B60K 11/085 180/68.1 |
| 8,128,158 B1 * | 3/2012 | Davis | ..................... | B60K 11/08 181/224 |
| 8,316,974 B2 * | 11/2012 | Coel | .................... | B60K 11/085 165/44 |
| 8,646,552 B2 * | 2/2014 | Evans | .................. | B60K 11/085 180/68.1 |
| 8,794,363 B2 * | 8/2014 | Wolf | .................... | B60K 11/085 180/68.1 |
| 8,820,450 B2 * | 9/2014 | Naito | ..................... | B60R 19/52 180/68.1 |
| 8,825,308 B2 * | 9/2014 | Nishimura | ........... | B60H 1/3208 180/68.1 |
| 8,833,498 B2 * | 9/2014 | Charnesky | ................ | F01P 7/10 180/68.1 |
| 8,919,300 B2 * | 12/2014 | Klinkert | ................. | B60K 11/08 123/41.58 |
| 8,960,343 B2 * | 2/2015 | Asano | .................... | B60K 11/04 180/68.1 |
| 9,370,995 B2 * | 6/2016 | Jeong | ................... | B62D 25/085 |
| 9,393,861 B2 * | 7/2016 | Hori | ...................... | B60K 11/04 |
| 9,988,096 B2 * | 6/2018 | Hall | ........................ | B60R 19/52 |
| 10,077,503 B2 * | 9/2018 | Hashimoto | .............. | C25D 3/12 |
| 10,377,226 B1 * | 8/2019 | Ross | ....................... | B60R 21/34 |
| 10,434,866 B2 * | 10/2019 | Wiech | .................... | B60K 11/02 |

FOREIGN PATENT DOCUMENTS

| | | |
|---|---|---|
| JP | 52053508 U | 4/1977 |
| JP | 5814345 B2 | 3/1983 |
| JP | 03117848 A | 5/1991 |
| JP | H06-023214 A | 2/1994 |
| JP | 11321644 A | 11/1999 |
| JP | 2003-261022 A | 9/2003 |
| JP | 2004-088845 A | 3/2004 |
| JP | 2008149885 A | 7/2008 |
| JP | 4243720 B2 | 3/2009 |
| JP | 2012-210914 A | 11/2012 |

OTHER PUBLICATIONS

Extended European Search Report dated Feb. 20, 2019, issued by the European Patent Office in corresponding European Application No. 16892439.7. (8 pages).

International Search Report (PCT/ISA/210) dated May 24, 2016, by the Japanese Patent Office as the International Searching Authority for International Application No. PCT/JP2016/056037.

Written Opinion (PCT/ISA/237) dated May 24, 2016, by the Japanese Patent Office as the International Searching Authority for International Application No. PCT/JP2016/056037.

* cited by examiner

VEHICULAR COOLING DEVICE

TECHNICAL FIELD

The present disclosure relates to a vehicular cooling device.

BACKGROUND ART

A vehicular cooling device mounted on a vehicle draws outside air that is air outside the vehicle, and sends the drawn outside air toward an electronic device that is a cooling target, thereby cooling the electronic device. The outside air may contain foreign objects, for example, rain, snow, or dust. Patent Literature 1 discloses a cooling device that discharges foreign objects from a discharge duct provided at an outlet of a centrifugal fan to keep the foreign objects from contacting the electronic device.

CITATION LIST

Patent Literature

Patent Literature 1: Examined Japanese Patent Application Publication No. S58-014345

SUMMARY OF INVENTION

Technical Problem

Installation of a foreign object separating mechanism, such as the cooling device disclosed in Patent Literature 1, in an interior of the vehicle poses difficulties in maintenance and inspection work. In addition, retrofitting the existing vehicle with such a mechanism is difficult.

The present disclosure is made in view of the above, and thus an objective of the present disclosure is to provide a simplified structure for removing the foreign objects contained in the outside air.

Solution to Problem

To achieve the foregoing objective, the present disclosure provides a vehicular cooling device including an opening, a discharge port, an air channel, a fan, and first blockers. The opening is formed in, among surfaces of the housing in which a cooling target is housed, a surface parallel to a travelling direction of a vehicle provided with the housing. The outside air flows through the opening in the housing. The discharge port is formed in a surface of the housing, and the outside air is discharged through the discharge port. The air channel is formed inside the housing, and includes one end connected to the opening and another end connected to the discharge port. The fan is provided inside the air channel to supply to the cooling target the outside air flowing through the opening into the air channel and discharge through the discharge port the outside that has undergone heat exchange with the cooling target. The first blockers are provided in the opening and spaced apart in the travelling direction. Each first blocker extends in a direction perpendicular to both of the travelling direction and an inflow direction of the outside air, and includes a first member and a second member. The first member is a plate-like member having a main surface intersecting the travelling direction. The first member and the second member of each first blocker are symmetric with respect to a plane perpendicular to the travelling direction, and have a travelling-direction spacing therebetween that increases along the inflow direction of the outside air.

Advantageous Effects of Invention

The present disclosure includes first blockers each including a first member and a second member. The first member is a plate-like member extending in a direction perpendicular to both of the travelling direction of the vehicle and the inflow direction of the outside air, and having a main surface intersecting the travelling direction. The first member and the second member are symmetric with respect to a plane perpendicular to the travelling direction. Such first blockers are provided in the opening and spaced apart in the travelling direction, thereby providing a simplified structure for removing foreign objects contained in the outside air.

DESCRIPTION OF EMBODIMENTS

Embodiments of the present disclosure are described below in detail with reference to the drawings. The same reference signs are used for the same or equivalent part throughout the drawings.

Embodiment 1

Figure 1:
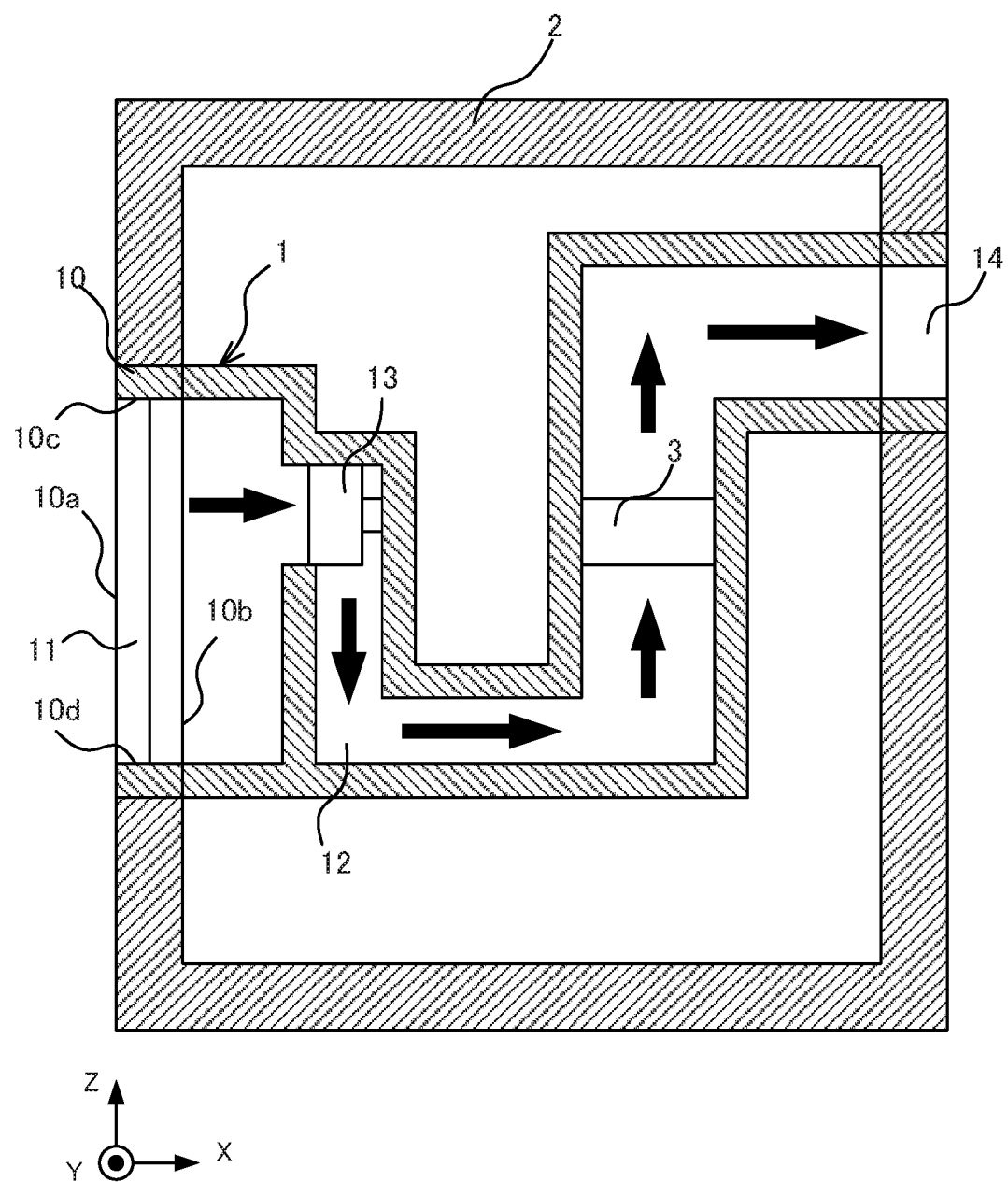
FIG. 1 is a cross-sectional view of a vehicular cooling device according to Embodiment 1 of the present disclosure.

FIG. 1 is a cross-sectional view of a vehicular cooling device according to Embodiment 1 of the present disclosure. The cross-sectional view in FIG. 1 illustrates a cross-section of the vehicular cooling device 1 (hereinafter referred to as a cooling device) that is in a plane perpendicular to a travelling direction of a vehicle. The vehicle, for example a railway vehicle, is provided with a housing 2 inside which a cooling target 3 is housed. In an example of FIG. 1, the housing 2 is a body of the railway vehicle itself. In the example of FIG. 1, the vertical direction is defined as a Z-axis direction, the travelling direction of the vehicle is defined as a Y-axis direction, and a width direction of the vehicle that is a tie direction when the vehicle is the railway vehicle is defined as an X-axis direction. The vehicle travels in a positive Y-axis direction or a negative Y-axis direction. The cooling device 1 includes an opening 10 and a discharge port 14. The opening 10 is formed in, among surfaces of the housing 2, a surface parallel to the travelling direction of the vehicle, which surface is one side surface of the body in the example of FIG. 1. The discharge port 14 through which the outside air is discharged is formed in a surface of the housing 2, which surface is another side surface of the body in the example of FIG. 1. The cooling device 1 further includes an air channel 12 and a fan 13. The air channel 12 is formed inside the housing 2, and includes one end connected to the opening 10 and another end connected to the discharge port 14. The fan 13 is provided inside the air channel 12 to supply the outside air to the cooling target 3 and discharge through the discharge port 14 the outside air that has undergone heat exchange with the cooling target 3.

In the example of FIG. 1, the opening 10 penetrates the housing 2 in the X-axis direction, and includes a first opening plane 10a that is located on the outer side of the housing 2 and a second opening plane 10b that is located on the air channel 12 side. The inflow direction of the outside air is a direction from the first opening plane 10a to the second opening plane 10b, that is, the positive X-axis direction. As indicated by arrows in FIG. 1, the outside air flows into the opening 10, passes through the opening 10, and flows into the air channel 12. The outside air flowing into the air channel 12 is supplied by the fan 13 to the cooling target 3, and the outside air that has undergone heat exchange with the cooling target 3 is discharged through the discharge port 14 to the outside of the housing 2. In the example of FIG. 1, the fan 13 is a centrifugal fan. The cooling target 3 may be any electronic device or heat sink, and the cooling target 3 may be, for example, an electric reactor or fins formed on a board with the electronic device mounted thereon. A single vehicle may be equipped with a plurality of cooling targets 3, and the cooling device 1 may be provided for each of the cooling targets 3.

First blockers 11 are provided in the opening 10 and spaced apart in the Y-axis direction. The first blockers 11 provided in the opening 10 remove foreign objects, such as rain, snow, or dust, that are substances other than air contained in the outside air. This enables simplifying a structure for removal of the foreign objects contained in the outside air.

Figure 2:
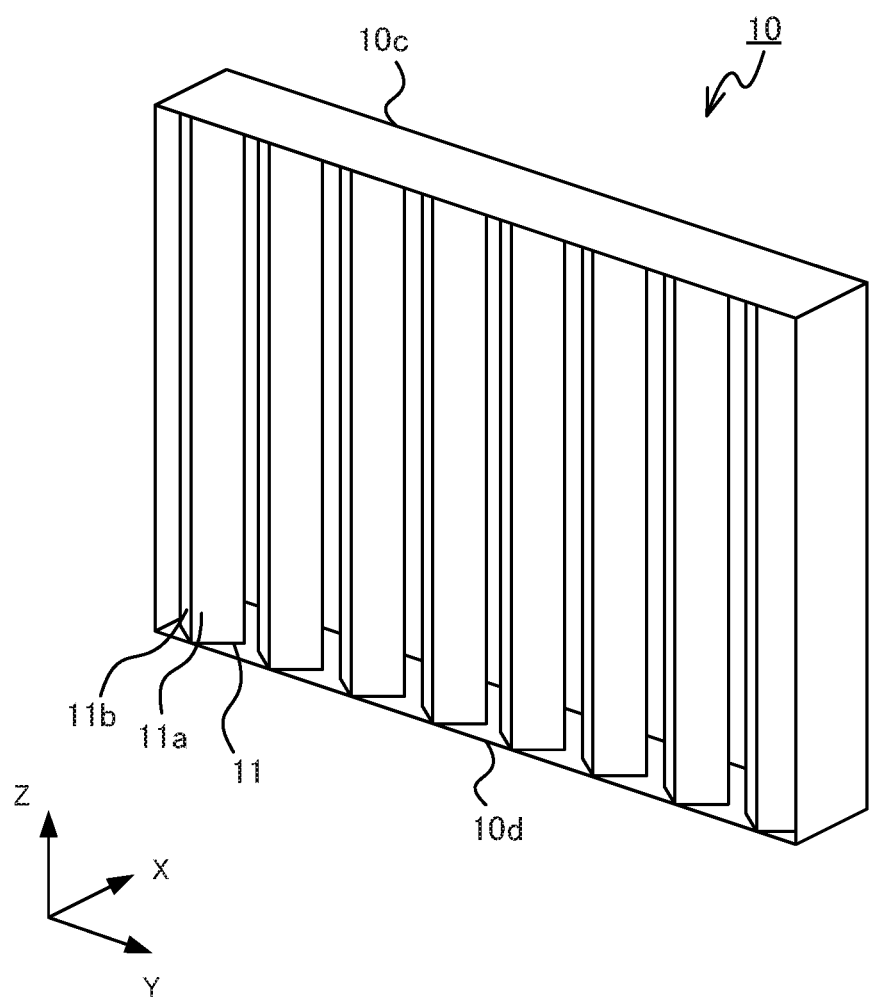
FIG. 2 is a perspective view of an opening according to Embodiment 1.
Figure 3:
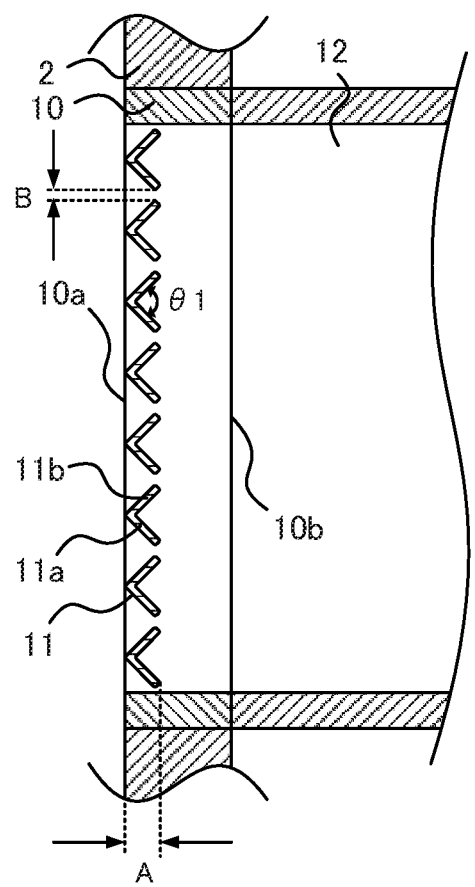
FIG. 3 is a cross-sectional view of the opening according to Embodiment 1.

FIG. 2 is a perspective view of the opening according to Embodiment 1. FIG. 3 is a cross-sectional view of the opening according to Embodiment 1. Eight first blockers 11 are spaced apart in the Y-axis direction in the example of FIGS. 2 and 3, but the number of the first blockers 11 may be any number that is two or more. Each first blocker 11 includes a first member 11a and a second member 11b. The first member 11a is a plate-like member extending in a direction perpendicular to both of the travelling direction and the inflow direction of the outside air, that is, extends in a Z-axis direction, and having a main surface intersecting the travelling direction of the vehicle, that is, the Y-axis direction. The first member 11a and the second member 11b are symmetric with respect to a plane perpendicular to the Y-axis direction. In the example of FIGS. 1 to 3, the first members 11a and the second members 11b extend in a direction of spacing between an upper surface 10c located on a vertically upper side of the opening 10 and a lower surface 10d located on a vertically lower side of the opening 10. The Y-axis-direction spacing between the first member 11a and the second member 11b that are included in the same first blocker 11 increases in the inflow direction of the outside air, that is, in the positive X-axis direction.

Figure 4:
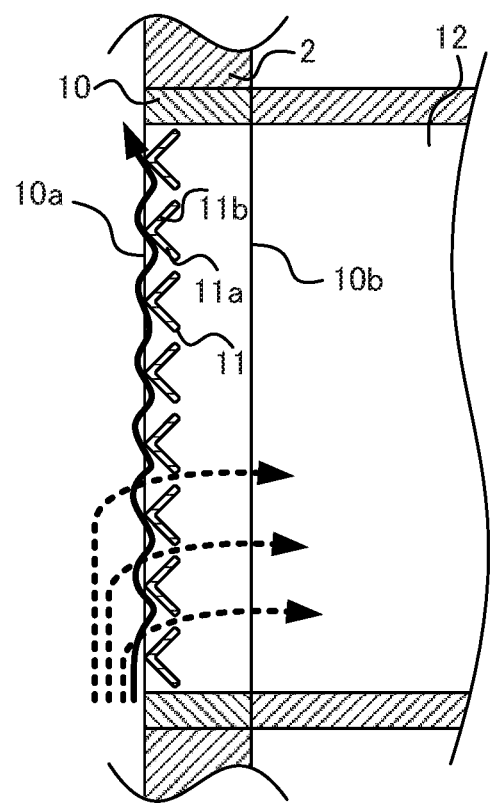
FIG. 4 is a drawing illustrating a flow of air and a flow of foreign objects in the opening according to Embodiment 1.
Figure 4:
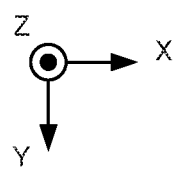

FIG. 4 is a drawing illustrating a flow of air and a flow of foreign objects in the opening according to Embodiment 1. In FIG. 4, the dashed arrows indicate the flow of air, and the solid arrow indicates the flow of foreign objects. The vehicle travels in the positive Y-axis direction in the example of FIG. 4. During travelling of the vehicle, the outside air has a velocity opposite to the travelling direction relative to the vehicle. Upon activation of the fan 13, the air thus passes through the space between the first blockers 11 and flows into the air channel 12, as illustrated by the dashed arrows in FIG. 4. In contrast, the foreign objects having higher specific gravity than air are displaced greatly in the travelling direction due to inertial force, strike against the first members 11a and the second members 11b, and are forced outward from the housing 2. As illustrated by the solid arrow in FIG. 4, the foreign objects repeatedly strike against the first members 11a and the second members 11b, and move backward from the opening 10 along the travelling direction of the vehicle without flowing into the air channel 12. When the vehicle travels in the negative Y-axis direction, the foreign objects similarly move backward from the opening 10 along the travelling direction of the vehicle without flowing into the air channel 12 since the first member 11a and the second member 11b of each first blocker 11 are symmetric to each other with respect to a plane.

Figure 5:
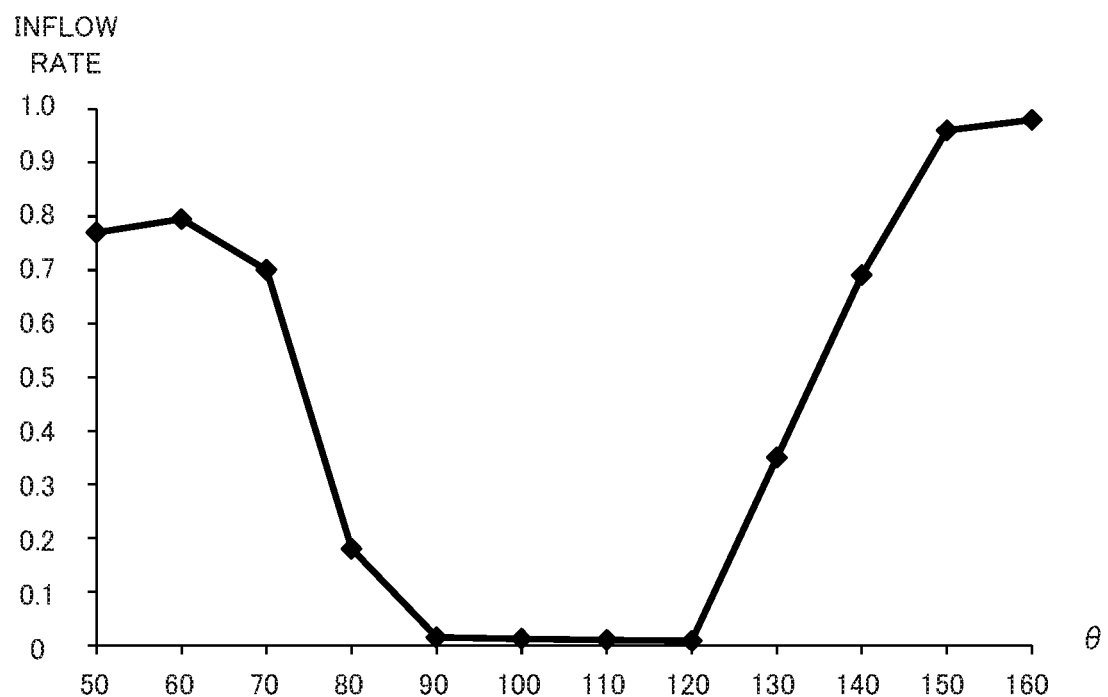
FIG. 5 is a graph illustrating a relationship between a vertex angle and an inflow rate of the foreign objects, according to Embodiment 1.

In the example of FIGS. 2 to 4, the first blocker 11 has a cross-section perpendicular to a direction in which the first member 11a extends, that is, a cross-section parallel to an XY-plane. The cross-section has a V-shape formed by the first member 11a and the second member 11b. Adjustment of a vertex angle of the V-shape, an angle θ1 in FIG. 3, can achieve a lower amount of the foreign objects flowing into the air channel 12. FIG. 5 is a graph illustrating a relationship between a vertex angle and an inflow rate of the foreign objects, according to Embodiment 1. FIG. 5 indicates a result of a three-dimensional fluid simulation in which particles having size and density equivalent to powder snow were generated as the foreign objects to move oppositely to the travelling direction, and the amount of the foreign objects flowing into the air channel 12 is measured. The graph has a horizontal axis indicating the angle θ1 and a vertical axis indicating the inflow rate of the foreign objects. The inflow rate of the foreign objects is a value expressed as a ratio of the amount of the foreign objects flowing through the space between the first blockers 11 into the air channel 12 to the amount of the foreign objects flowing into the air channel 12 when plates having a main surface parallel to the YZ-plane are arranged in the opening 10 and spaced apart in the Y-axis direction. This simulation was performed at each angle with the widths A of the first blockers 11 in the X-axis direction in FIG. 3 set to the same value, and with the sum of the values of gaps B between the first blockers 11 in the Y-axis direction in FIG. 3 set to the same value. The example of FIG. 5 shows that the inflow rate is less than 1 in the range of $60°<\theta1<150°$, and thus setting the angle $\theta1$ in the range of $60°<\theta1<150°$ is preferable. Setting the angle $\theta1$ in the range of $90°<\theta1<120°$ is preferable to further lower the inflow rate.

Figure 6:
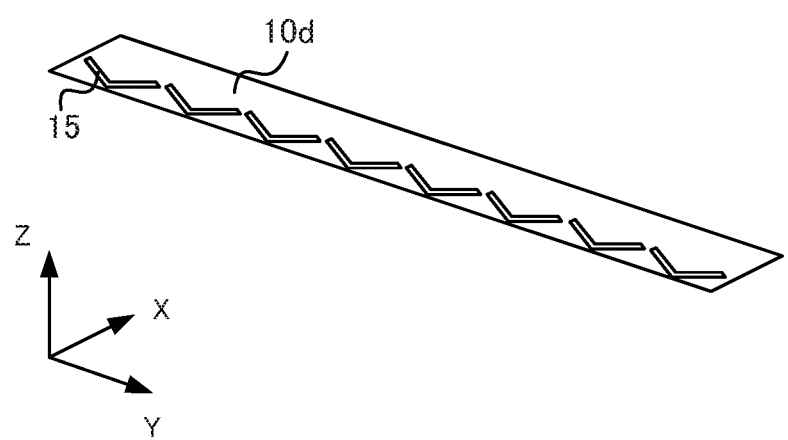
FIG. 6 is a drawing illustrating a lower surface of the opening according to Embodiment 1.

The first blockers 11 may be fastened in the opening 10 in any manner. FIG. 6 is a drawing illustrating a lower surface of the opening according to Embodiment 1. Recessed portions 15 for positioning are formed on the inside of the lower surface 10d of the opening 10, that is, a side facing an inner space of the opening 10. Similarly, recessed portions 15 are formed on the inside of the upper surface of the opening 10. Engagement of the first blockers 11 in the recessed portions 15 at both ends of the first blockers 11 in the Z-axis direction fastens the first blockers 11 in the opening 10. As described above, the first blockers 11 can be fastened in the opening 10 by engagement of the first blockers 11 with the recessed portions 15 formed in two surfaces that are on the inside of the opening 10 and intersect the direction in which the first members 11a extend. Forming the recessed portions 15 enables easy positioning of the first blockers 11 in manufacture of the cooling device 1. The opening 10 and the first blockers 11 can be manufactured separately.

Figure 7:
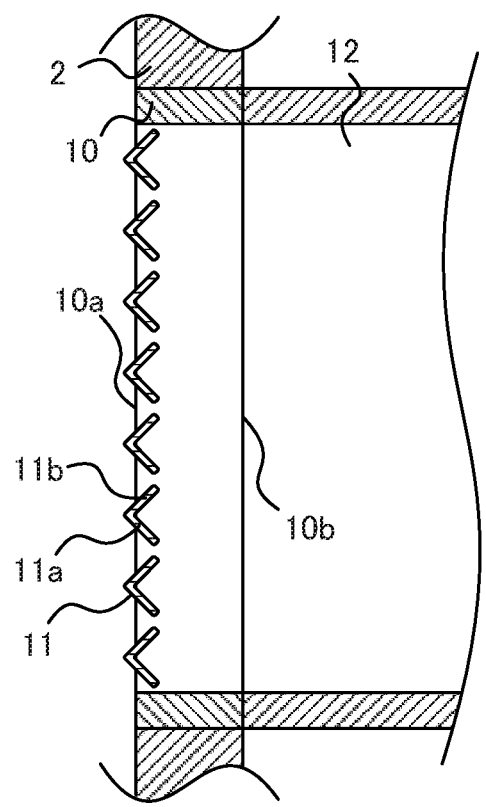
FIG. 7 is a cross-sectional view of a variation of the opening according to Embodiment 1.
Figure 7:
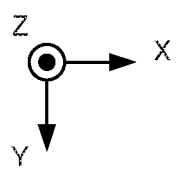

Connections between the first members 11a and the second members 11b are located on the first opening plane 10a in the above-described example, but the arrangement of the first blockers 11 is not limited to that of the above-described example. FIG. 7 is a cross-sectional view of a variation of the opening according to Embodiment 1. As illustrated in FIG. 7, at least a portion of each first blocker 11 may project outside the housing 2 from the first opening plane 10a. This also applies to embodiments below. Arranging the first blockers 11 such that at least a portion of each first blocker 11 projects outside the housing 2 from the first opening plane 10a can achieve a lower amount of the foreign objects flowing into the air channel 12.

Figure 8:
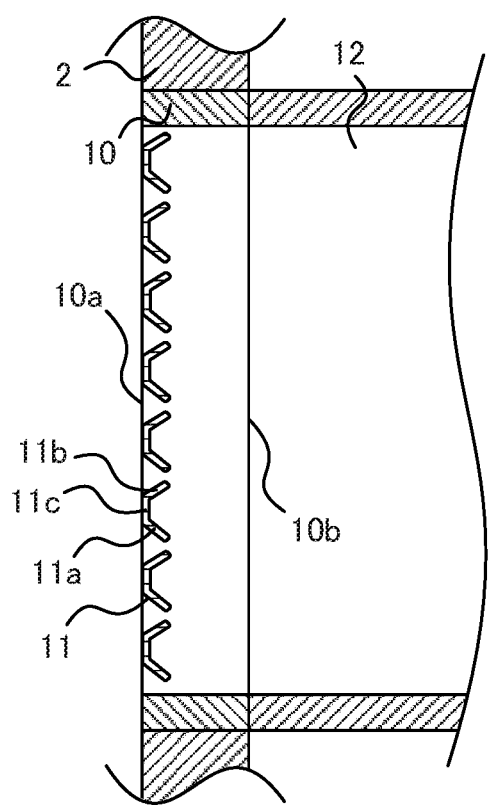
FIG. 8 is a cross-sectional view of another variation of the opening according to Embodiment 1.
Figure 8:
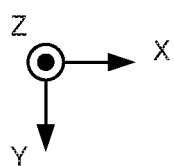
Figure 9:
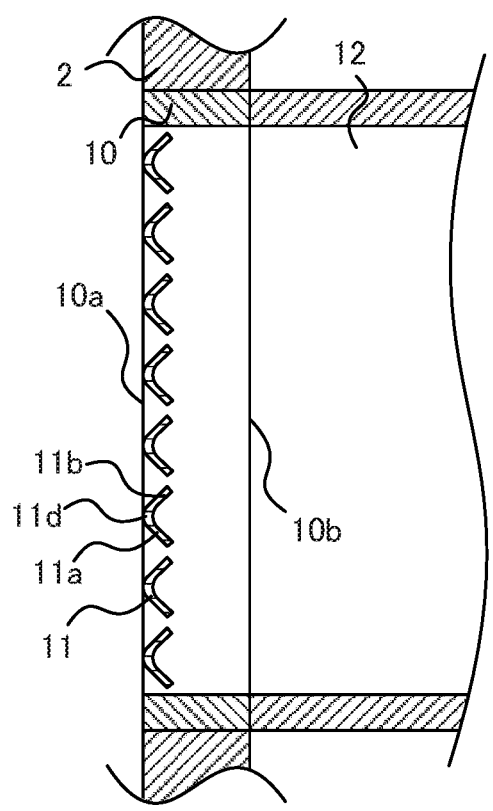
FIG. 9 is a cross-sectional view of yet another variation of the opening according to Embodiment 1.
Figure 9:
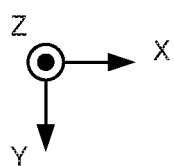

The first blockers 11 described above are each a V-shaped member that is formed by folding a single plate-like member and has a V-shape in a cross-section parallel to the XY-plane. However, the shape of the first blockers 11 is not limited to that of the above-described example. Each first blocker 11 may include the first member 11a and the second member 11b that are narrowly spaced apart in the Y-axis direction in the first opening plane 10a. The spacing between the first member 11a and the second member 11b in the first opening plane 10a can be determined in accordance with the result of simulation on the amount of the foreign objects flowing into the air channel 12. FIGS. 8 and 9 are cross-sectional views of variations of the opening according to Embodiment 1. As illustrated in FIG. 8, each first blocker 11 may have a trapezoidal shape in a cross-section parallel to the XY-plane. This trapezoidal shape may be a shape including, except for a lower base, inclined surfaces that are the first member 11a and the second member 11b and an upper base that is a connection member 11c. Here, the connection member 11c is a plate having a main surface parallel to the YZ-plane. As illustrated in FIG. 9, the first blocker 11 may include the first member 11a, the second member 11b, and a connection member lid having an arc shape in a cross-section parallel to the XY-plane. This also applies to embodiments below.

Figure 10:
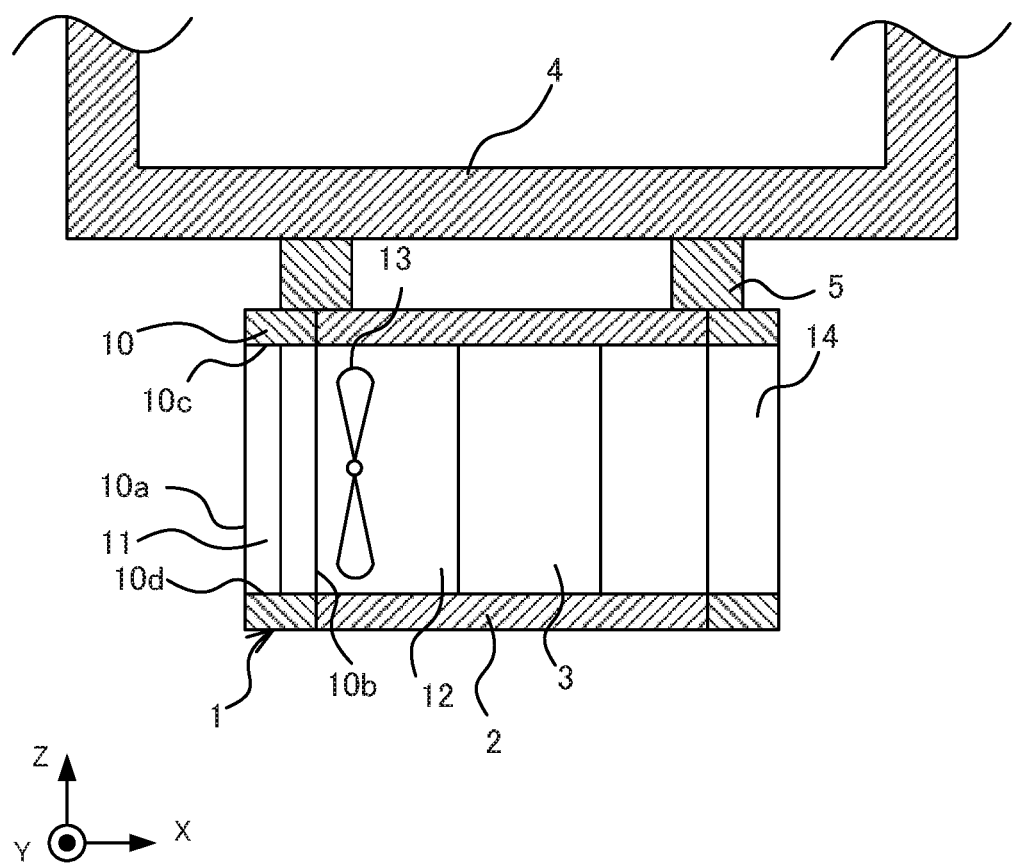
FIG. 10 is a cross-sectional view of a variation of the vehicular cooling device according to Embodiment 1.

The structure of the cooling device 1 is not limited to the above examples. FIG. 10 is a cross-sectional view of a variation of the vehicular cooling device according to Embodiment 1. In the example of FIG. 10, the cooling device 1 is provided vertically downward from a body 4. The air channel 12 forms a portion of the housing 2. The housing 2 in which the cooling target 3 is housed is mounted vertically below the body 4 through a suspension member 5 and a not-illustrated fastener member. The fan 13 is an axial fan in the example of FIG. 10. Similarly to the example of FIG. 1, the opening 10 includes the first opening plane 10a and the second opening plane 10b that are perpendicular to the X-axis direction, and the first blockers 11 are provided in the opening 10.

Figure 11:
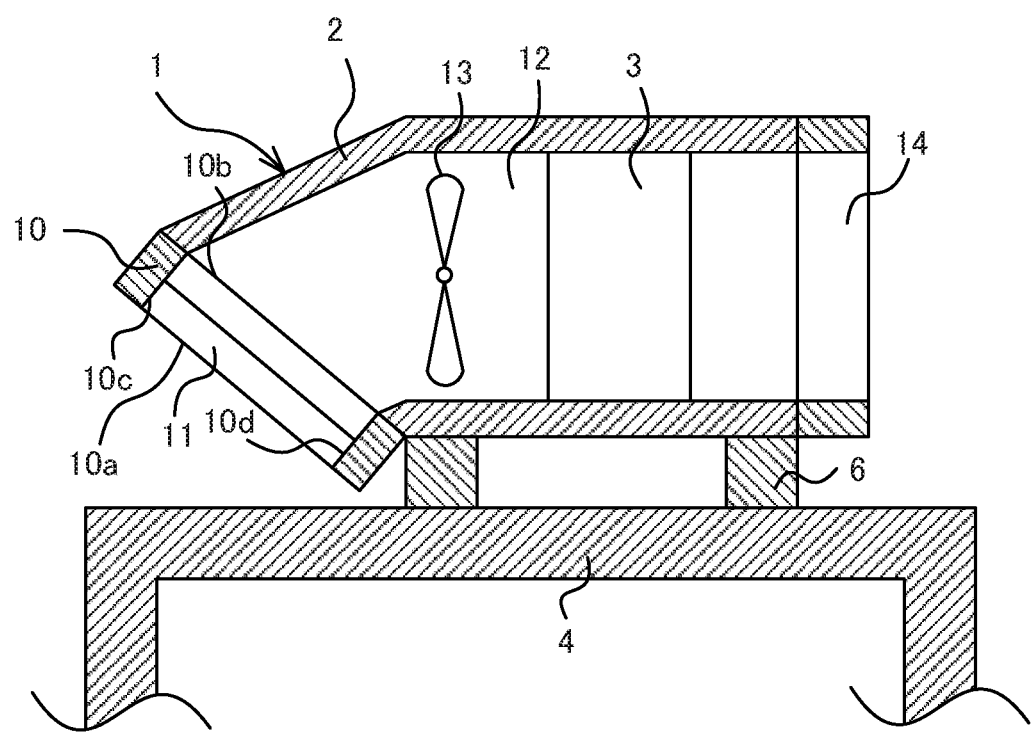
FIG. 11 is a cross-sectional view of another variation of the vehicular cooling device according to Embodiment 1.
Figure 11:
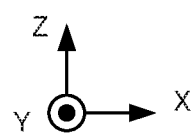

FIG. 11 is a cross-sectional view of another variation of the vehicular cooling device according to Embodiment 1. In the example of FIG. 11, the cooling device 1 is provided vertically above the body 4. The air channel 12 forms a portion of the housing 2. The housing 2 in which the cooling target 3 is housed is mounted vertically above the body 4 through a support member 6 and a not-illustrated fastener member. The fan 13 is an axial fan in the example of FIG. 11. In the example of FIG. 11, the first opening plane 10a is inclined toward a ceiling side of the body 4 with respect to a plane parallel to the YZ-plane. The arrangement of the first opening plane 10a in a position illustrated in FIG. 11 can achieve a lower amount of the foreign objects flowing into the air channel 12.

As described above, the cooling device 1 according to Embodiment 1 includes the first blockers 11 that include the first members 11a and the second members 11b and are provided in the opening 10 and spaced apart in the travelling direction, thereby providing a simplified structure for removing the foreign objects contained in the outside air without the need for providing a mechanism for removal of the foreign objects in the interior of the vehicle.

Embodiment 2

Figure 12:
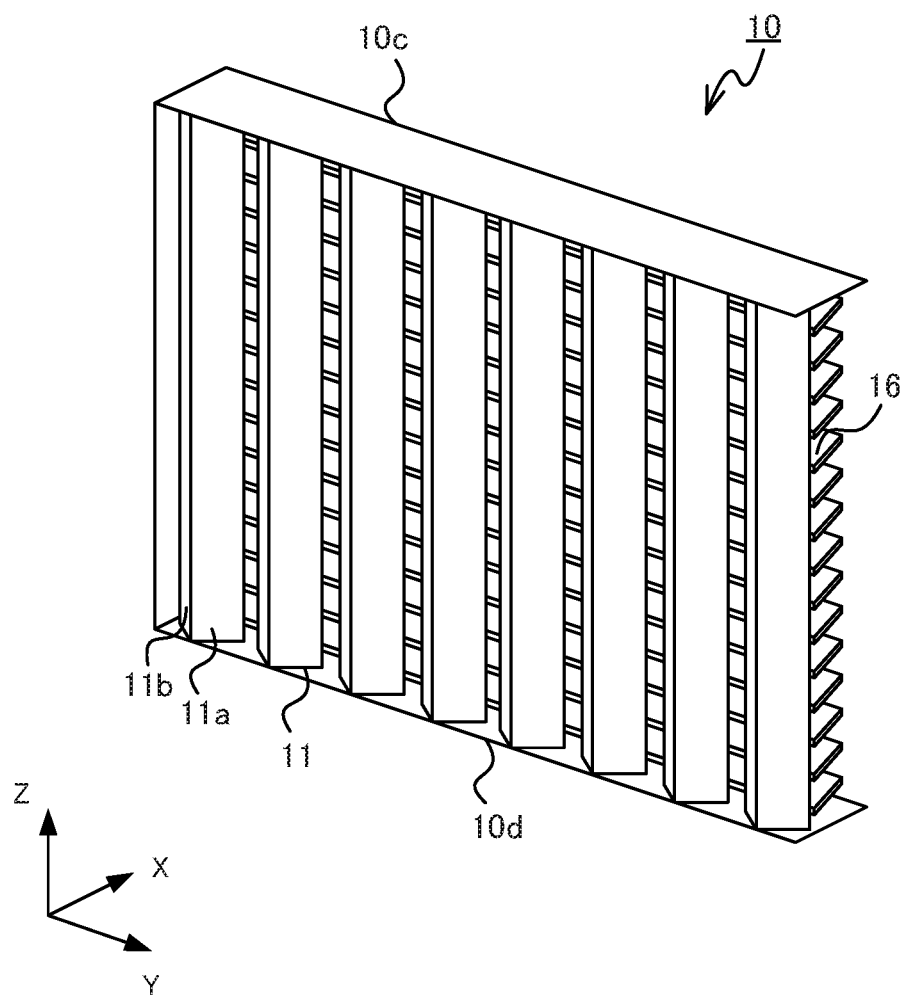
FIG. 12 is a perspective view of an opening according to Embodiment 2 of the present disclosure.

FIG. 12 is a perspective view of an opening according to Embodiment 2 of the present disclosure. In addition to the structure of the opening 10 according to Embodiment 1, the opening 10 according to Embodiment 2 includes second blockers 16 located closer to the air channel 12 than the first blockers 11. The second blockers 16 are plate-like members extending in the travelling direction, that is, the Y-axis direction, and spaced apart in the direction perpendicular to both of the travelling direction of the vehicle and the inflow direction of the outside air, that is, the Z-axis direction. In the example of FIG. 12, the spacing between the second blockers 16 and the lower surface 10d increases in the positive X-axis direction.

The foreign objects passing through the space between the first blockers 11 strike against the second blockers 16, and then slow down and fall vertically downward, thereby suppressing or preventing inflow of the foreign objects into the air channel 12.

When the penetration direction of the opening 10 is in the vertical direction, arranging the horizontally extending second blockers 16 at positions closer to the air channel 12 than the first blockers 11 can suppress or prevent the inflow of the foreign objects into the air channel 12.

As described above, the cooling device 1 with the first blockers 11 as well as the second blockers 16 according to Embodiment 2 can further lower the amount of the foreign objects flowing into the air channel 12.

Embodiment 3

Figure 13:
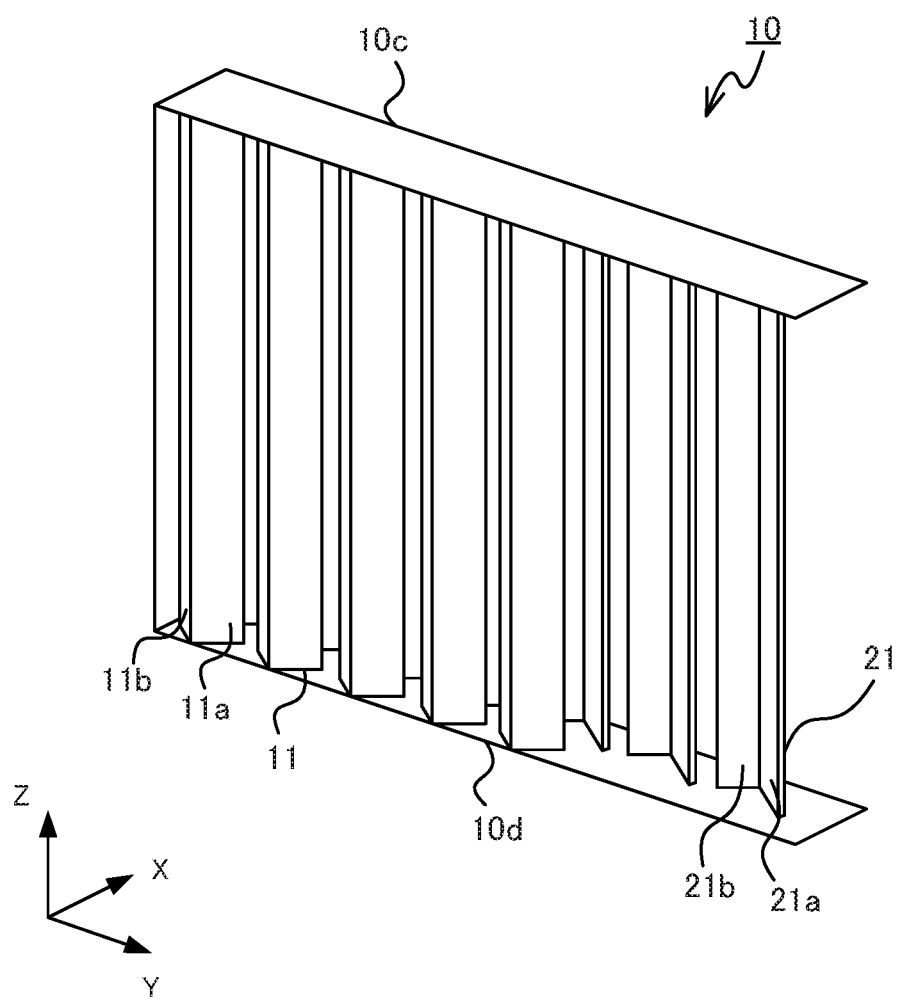
FIG. 13 is a perspective view of an opening according to Embodiment 3 of the present disclosure.
Figure 14:
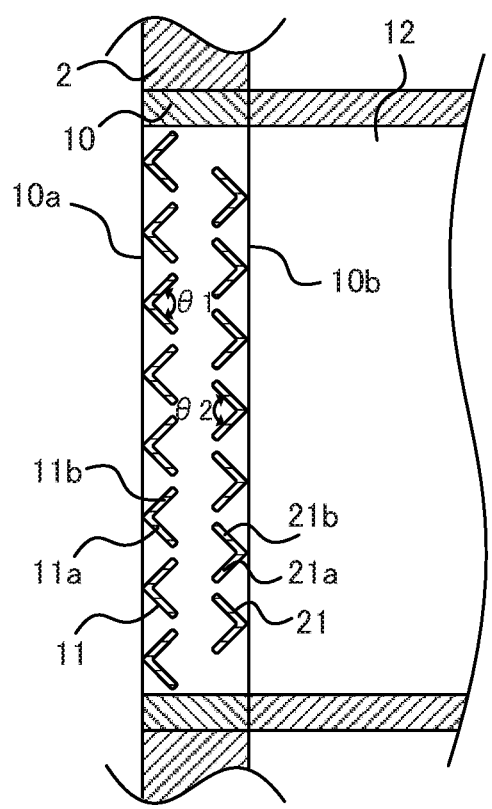
FIG. 14 is a cross-sectional view of the opening according to Embodiment 3.

FIG. 13 is a perspective view of an opening according to Embodiment 3 of the present disclosure. A side surface of the opening 10 and some of the first blockers 11 are omitted in FIG. 13. FIG. 14 is a cross-sectional view of the opening according to Embodiment 3. In addition to the structure of the opening 10 according to Embodiment 1, the opening 10 according to Embodiment 3 further includes third blockers 21 spaced apart in the Y-axis direction at positions to block a flow path of the outside air that passes through a space between the first blockers 11 toward the air channel 12. The number of the third blockers 21 can be any number. Each third blocker 21 includes a third member 21a and a fourth member 21b. The third member 21a is a plate-like member extending in the direction perpendicular to both of the travelling direction and the inflow direction of the outside air, that is, the Z-axis direction, and having a main surface intersecting the Y-axis direction. The third member 21a and the fourth member 21b are symmetric with respect to a plane perpendicular to the Y-axis direction. The Y-axis-direction spacing between the third member 21a and the fourth member 21b decreases in the inflow direction of the outside air, that is, in the positive X-axis direction.

In the example of FIGS. 13 and 14, the third blockers 21 are provided such that points of connection between the third members 21a and the fourth members 21b in the lower surface 10d are located on straight lines parallel to the X-axis and passing through the midpoints of the spaces between the first blockers 11.

The first blockers 11 and the third blockers 21 are provided in the opening 10 in the example of FIGS. 13 and 14, but any additional number of third blockers 21 may be provided. In this case, the additional third blockers 21 are provided at positions to block a flow path of the outside air that flows in the positive X-axis direction through spaces between the third blockers 21 that are adjacent to the additional third blockers 21 and located on the first opening plane 10a side with respect to the additional third blockers 21. For example, the additional third blockers 21 are located on the lower surface 10d such that the points of connection between the third member 21a and the fourth member 21b are on straight lines parallel to the X-axis and passing through the midpoints of the spaces between the third blockers 21.

Figure 15:
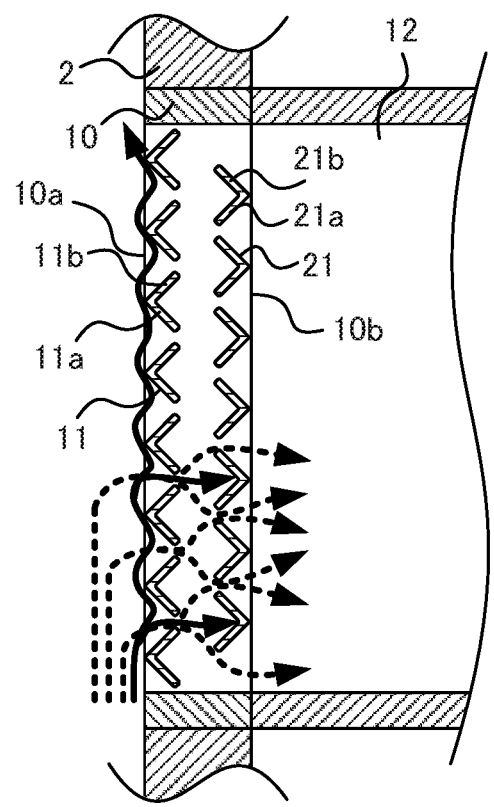
FIG. 15 is a drawing illustrating a flow of air and a flow of foreign objects in the opening according to Embodiment 3.

FIG. 15 is a drawing illustrating a flow of air and a flow of foreign objects in the opening according to Embodiment 3. In FIG. 15, the dashed arrows indicate the flow of air, and the solid arrow indicates the flow of foreign objects. In comparison to when the vehicle travels at high speed, velocity of the foreign objects relative to the vehicle is lower when the vehicle travels at low speed or when water splashes from a railroad surface, and thus the foreign objects, for example, water droplets or small stones, having a volume and a density that exceed a predetermined value may pass through the space between the first blockers 11. In the cooling device 1 according to Embodiment 3, the foreign objects passing through the space between the first blockers 11 strike against the third blockers 21 and then slow down. The third blockers 21 have the recessed parts on the first opening plane 10a side, and thus air resides near the recessed parts. The foreign objects that strike against the third blockers 21 thus fall vertically along the third blockers 21, thus avoiding the entry of the foreign objects into the air channel 12.

In the example of FIGS. 13 to 15, similarly to Embodiment 1, each first blocker 11 has a cross-section parallel to the XY-plane and having a V-shape formed by the first member 11a and the second member 11b. Similarly, each third blocker 21 has a cross-section perpendicular to the direction in which the third member 21a extends, that is, a cross-section parallel to the XY-plane. The cross-section has a V-shape formed by the third member 21a and the fourth member 21b. Adjustment of a vertex angle of the V-shape, angles θ1 and θ2 in FIG. 14, can achieve a lower amount of the foreign objects flowing into the air channel 12. Setting the angles θ1 and θ2 in the range of angles greater than 60° and less than 150° is preferable as in Embodiment 1.

The first blockers 11 are each formed by folding a single plate-like member, and have the recessed parts on the second opening plane 10b side. This secures a flow path for air passing through the spaces between the first blockers 11 toward spaces between the third blockers 21, even if the opening 10 has a narrow width in the X-axis direction.

Figure 16:
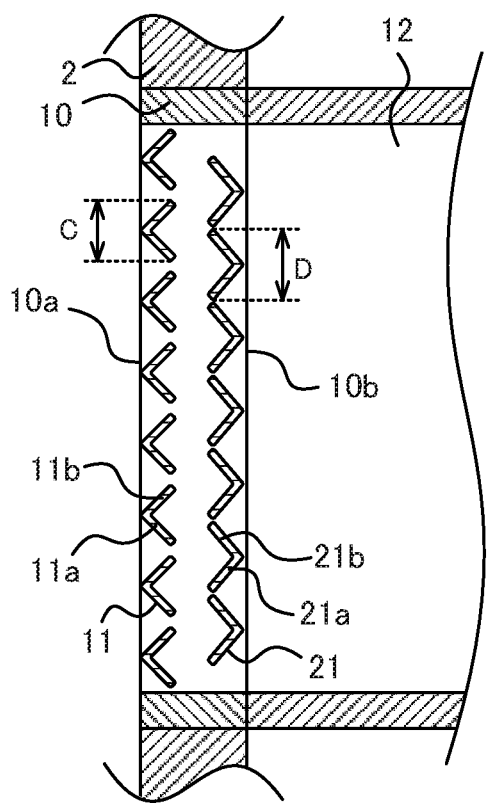
FIG. 16 is a cross-sectional view of a variation of the opening according to Embodiment 3.
Figure 16:
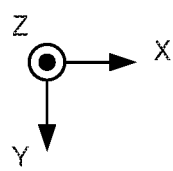

FIG. 16 is a cross-sectional view of a variation of the opening according to Embodiment 3. The width of the first blockers 11 in the Y-axis direction is the same as the width of the third blockers 21 in the Y-axis direction in the example of FIGS. 13 to 15, but the width of the first blockers 11 in the Y-axis direction may be different from the width of the third blockers 21 in the Y-axis direction. In the example of FIG. 16, the width D of the third blockers 21 in the Y-axis direction is greater than the width C of the first blockers 11 in the Y-axis direction. Setting the width D of the third blockers 21 in the Y-axis direction to be greater than the width C of the first blockers 11 in the Y-axis direction increases a proportion of the foreign objects that strike against the third blockers 21. This can achieve a lower amount of the foreign objects flowing into the air channel 12.

The shape of the third blockers 21 may be similar to the shapes of the first blockers 11 illustrated in FIGS. 8 and 9, and is not limited to the above-described examples.

Figure 17:
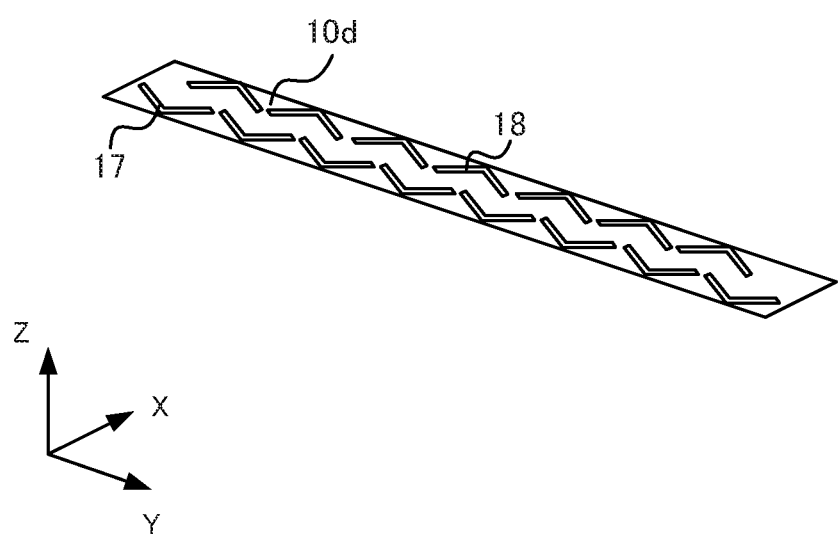
FIG. 17 is a drawing illustrating a lower surface of the opening according to Embodiment 3.

The first blockers 11 and the third blockers 21 may be fastened to the opening 10 in any manner. Similarly to Embodiment 1, the first blockers 11 and the third blockers 21 can be fastened to the opening 10 with the first blockers 11 and the third blockers 21 engaged in the recessed portions. Here, the recessed portions are formed in two surfaces on the inside of the opening 10, and the two surfaces intersect the direction in which the first members 11a extend. FIG. 17 is a drawing illustrating a lower surface of the opening according to Embodiment 3. First recessed portions 17 and second recessed portions 18 for positioning are formed on the inside of the lower surface 10d of the opening 10. The first recessed portions 17 and the second recessed portions 18 are also formed on the inside of the upper surface 10c of the housing 10. Engagement of the first blockers 11 in the first recessed portions 17 at both ends of the first blockers 11 in the Z-axis direction fastens the first blockers 11 in the opening 10. Engagement of the third blockers 21 in the second recessed portions 18 at both ends of the third blockers 11 in the Z-axis direction fastens the third blockers 21 in the opening 10. Forming the first recessed portions 17 and the second recessed portions 18 enables easy positioning of the first blockers 11 and the third blockers 21 in manufacture of the cooling device 1. The opening 10, the first blockers 11, and the third blockers 21 can be manufactured separately.

As described above, the cooling device 1 with the first blockers 11 as well as the third blockers 21 according to Embodiment 3 can further lower the amount of the foreign objects flowing into the air channel 12.

Embodiment 4

Figure 18:
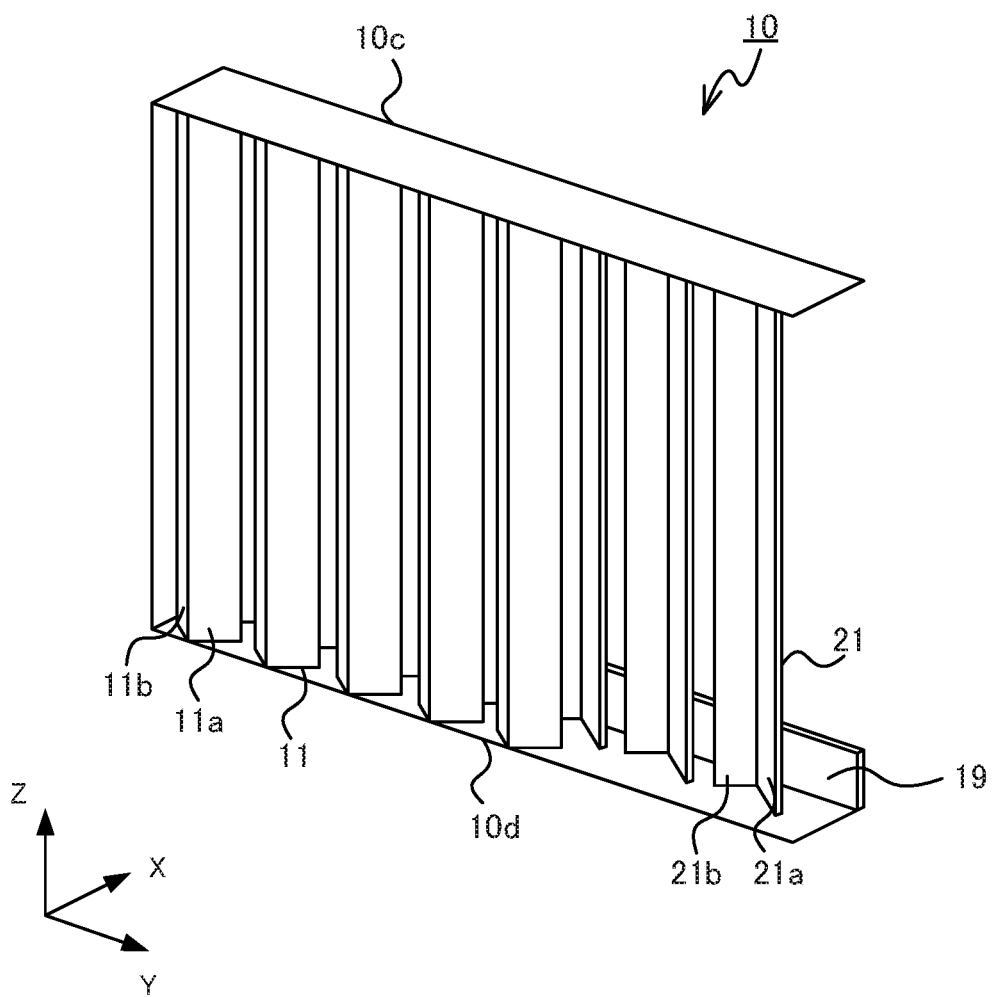
FIG. 18 is a perspective view of an opening according to Embodiment 4 of the present disclosure.
Figure 19:
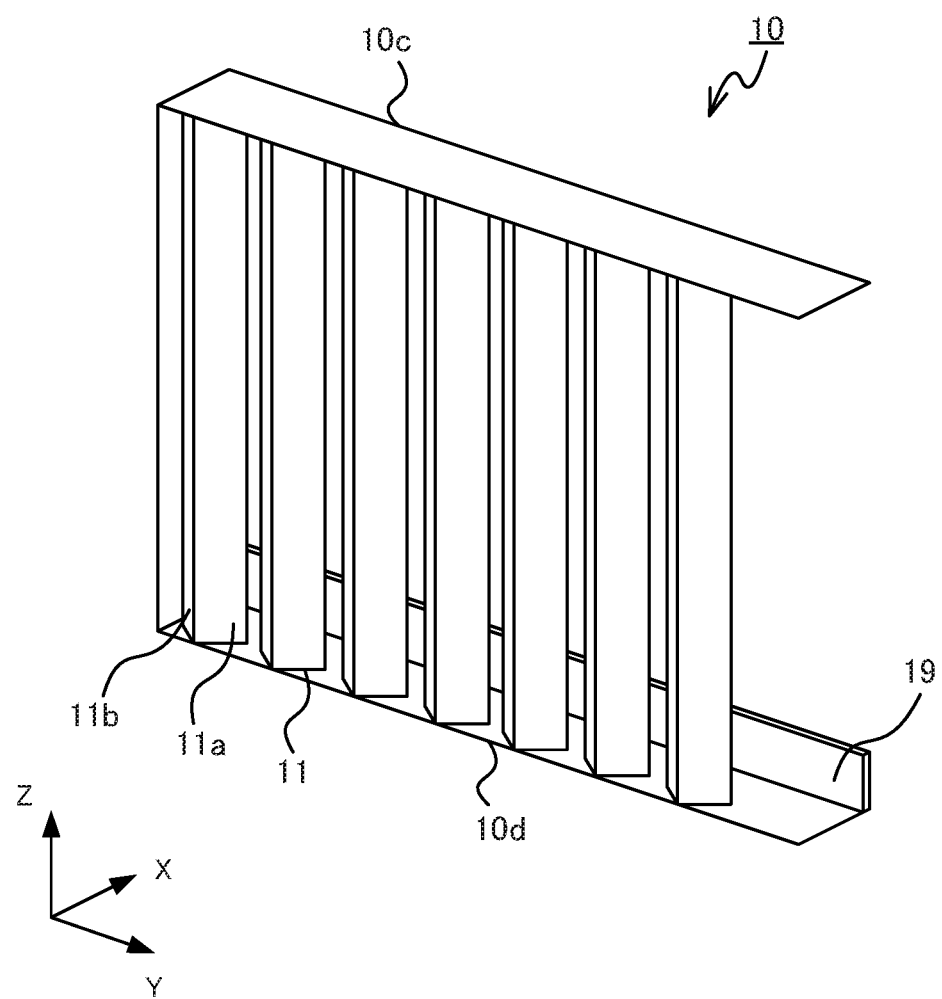
FIG. 19 is a perspective view of a variation of the opening according to Embodiment 4.

FIG. 18 is a perspective view of an opening according to Embodiment 4 of the present disclosure. FIG. 19 is a perspective view of a variation of the opening according to Embodiment 4. A side surface of the opening 10 and some of the first blockers 11 are omitted in FIGS. 18 and 19. In addition to the structure of the opening 10 according to Embodiments 1 to 3, the opening 10 according to Embodiment 4 further includes a shielding surface 19 extending from the lower surface 10d toward the upper surface 10c of the opening 10 to block a portion of the second opening plane 10b. The shielding surface 19 is formed in a region of connection between the opening 10 and the air channel 12.

The opening 10 illustrated in FIG. 18 is the opening 10 according to Embodiment 3 provided with the shielding surface 19. The opening 10 illustrated in FIG. 19 is the opening 10 according to Embodiment 1 provided with the shielding surface 19. Although not illustrated, the shielding surface 19 may be provided in the opening 10 of the cooling device 1 according to Embodiment 2.

Providing the shielding surface 19 can suppress or prevent inflow of the foreign objects falling down on the lower surface 10d into the air channel 12 along the lower surface 10d.

As described above, the cooling device 1 with the shielding surface 19 according to Embodiment 4 can further lower the amount of the foreign objects flowing into the air channel 12.

Embodiment 5

Figure 20:
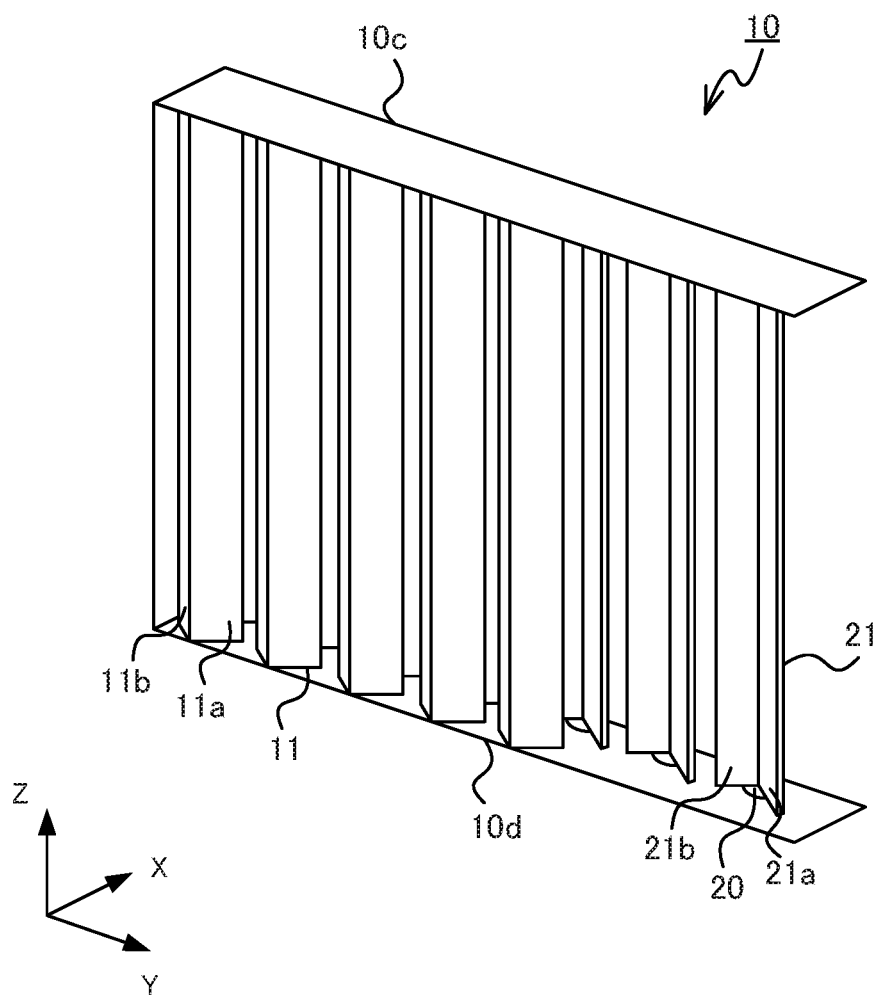
FIG. 20 is a perspective view of an opening according to Embodiment 5 of the present disclosure.
Figure 21:
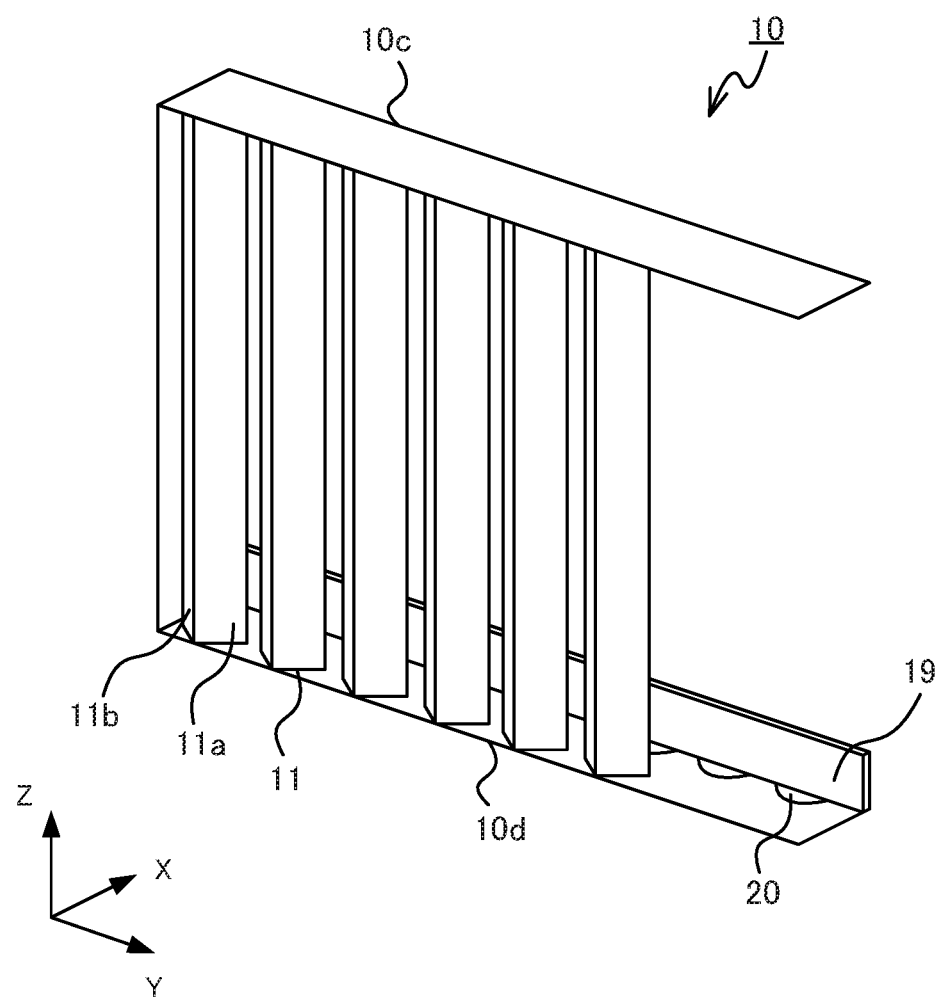
FIG. 21 is a perspective view of a variation of the opening according to Embodiment 5.

FIG. 20 is a perspective view of an opening according to Embodiment 5 of the present disclosure. FIG. 21 is a perspective view of a variation of the opening according to Embodiment 5. A side surface of the opening 10 and some of the first blockers 11 are omitted in FIGS. 20 and 21. The opening 10 according to Embodiment 5 is an opening formed by providing the lower surface 10d of the opening 10 according to Embodiments 1 to 4 with holes 20 through which the foreign objects contained in the outside air that flows into the opening 10 are discharged. Although the holes 20 may have any shape, the holes 20 have a shape and a cross-sectional area that allow the foreign objects to be discharged.

The opening 10 illustrated in FIG. 20 is obtained by forming the holes 20 in a region between the third members 21a and the fourth members 21b in the lower surface 10d of the opening 10 according to Embodiment 3. The opening 10 illustrated in FIG. 21 is obtained by forming the holes 20 through the lower surface 10d of the opening 10 according to Embodiment 4 illustrated in FIG. 19 in a region contacting the shielding surface 19. Although not illustrated, the holes 20 may be formed through the lower surface 10d of the opening 10 according to Embodiment 2 or 3 or the lower surface 10d of the opening 10 according to Embodiment 4 illustrated in FIG. 18.

Providing the holes 20 can suppress or prevent inflow of the foreign objects falling down on the lower surface 10d into the air channel 12 along the lower surface 10d.

As described above, the cooling device 1 having the holes 20 through the lower surface 10d of the opening 10 according to Embodiment 5 can further lower the amount of the foreign objects flowing into the air channel 12.

Embodiment 6

Figure 22:
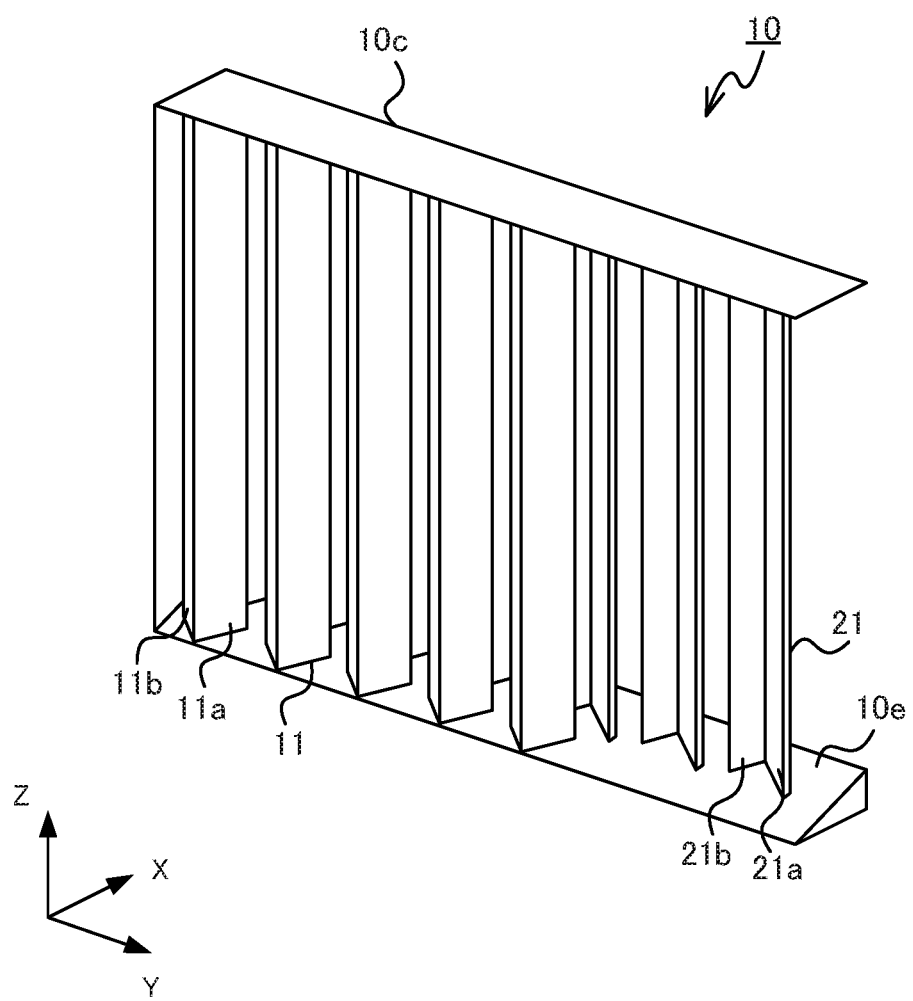
FIG. 22 is a perspective view of an opening according to Embodiment 6 of the present disclosure.
Figure 23:
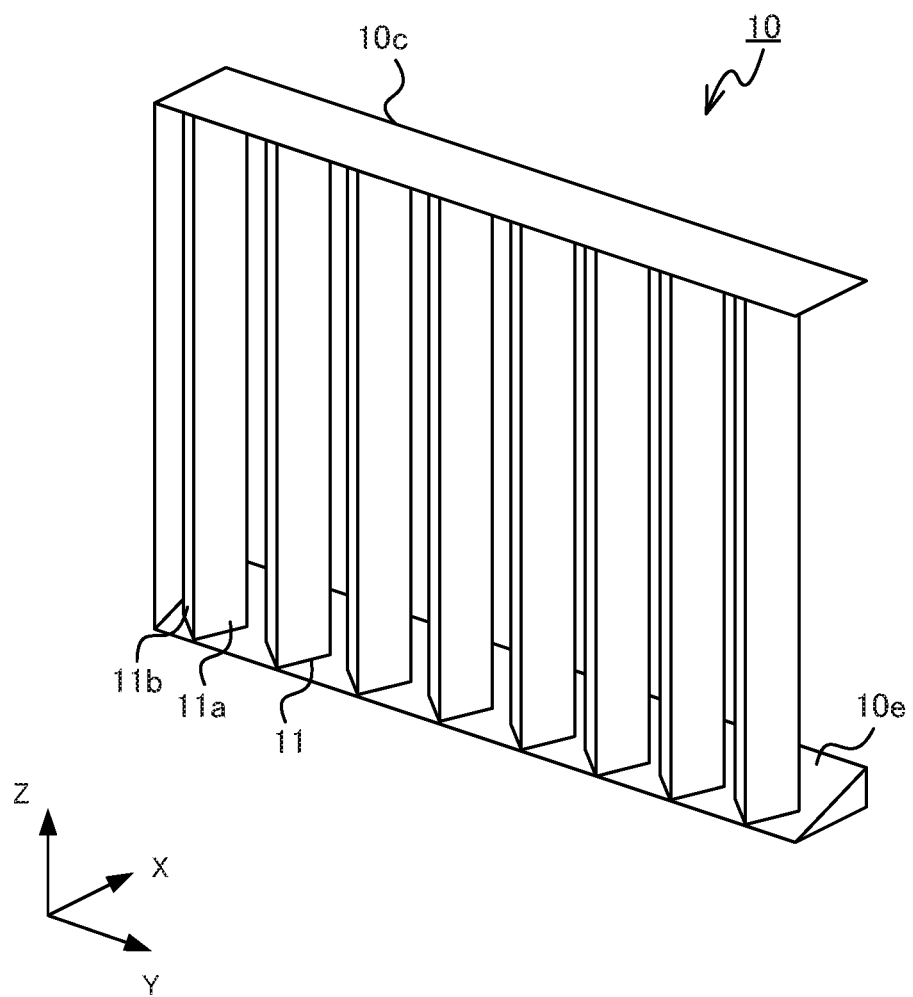
FIG. 23 is a perspective view of a variation of the opening according to Embodiment 6.

FIG. 22 is a perspective view of an opening according to Embodiment 6 of the present disclosure. FIG. 23 is a perspective view of a variation of the opening according to Embodiment 6. A side surface of the opening 10 and some of the first blockers 11 are omitted in FIGS. 22 and 23. Instead of the lower surface 10d of the opening 10 according to Embodiments 1 to 4, the opening 10 according to Embodiment 6 includes a lower surface 10e having a thickness in the direction perpendicular to both the travelling direction and the inflow direction of the outside air, that is, in the Z-axis direction, the thickness being greater in the inflow direction of the outside air, that is, along the positive X-axis direction.

The opening 10 illustrated in FIG. 22 is obtained by providing the lower surface 10e instead of the lower surface 10d of the opening 10 according to Embodiment 3. The opening 10 illustrated in FIG. 23 is obtained by providing the lower surface 10e instead of the lower surface 10d of the opening 10 according to Embodiment 1. Although not illustrated, the lower surface 10e may be provided instead of the lower side 10d of the opening 10 according to Embodiment 2 or 4. The holes 20 may be provided through the lower surface 10e, similarly to that of Embodiment 5.

Providing the lower surface 10e can suppress or prevent inflow of the foreign objects falling down on the lower surface 10e into the air channel 12 along the lower surface 10e.

As described above, the cooling device 1 with the lower surface 10e according to Embodiment 6 can lower the amount of the foreign objects flowing into the air channel 12.

The present disclosure is not limited to the above-described embodiments. Any combination of the above-described embodiments can be achieved.

The foregoing describes some example embodiments for explanatory purposes. Although the foregoing discussion has presented specific embodiments, persons skilled in the art will recognize that changes may be made in form and detail without departing from the broader spirit and scope of the invention. Accordingly, the specification and drawings are to be regarded in an illustrative rather than a restrictive sense. This detailed description, therefore, is not to be taken in a limiting sense, and the scope of the invention is defined only by the included claims, along with the full range of equivalents to which such claims are entitled.

REFERENCE SIGNS LIST

1 Cooling device
2 Housing
3 Cooling target
4 Body
5 Suspension member
6 Opening
10a First opening plane
10b Second opening plane
10c Upper surface
10d, 10e Lower surface
11 First blocker
11a First member
11b Second member
11c, 11d Connection member 12 Air channel
13 Fan
14 Discharge port
15 Recessed portion
16 Second blocker
17 First recessed portion
18 Second recessed portion
19 Shielding surface
20 Hole
21 Third blocker
21a Third member
21b Fourth member

The invention claimed is:

1. A vehicular cooling device, comprising:
an opening through which outside air flows into a housing in which a cooling target is housed, the opening being formed in, among surfaces of the housing, a surface parallel to a travelling direction of a vehicle provided with the housing;
a discharge port through which the outside air is discharged, formed in a surface of the housing;
an air channel formed inside the housing and including one end connected to the opening and another end connected to the discharge port;
a fan provided inside the air channel to supply to the cooling target the outside air that flows through the opening into the air channel and discharge through the discharge port the outside air that has undergone heat exchange with the cooling target; and
first blockers spaced apart in the travelling direction in the opening,
wherein each of the first blockers extends in a direction perpendicular to both of the travelling direction and an inflow direction of the outside air, and includes a first member and a second member, the first member being a plate-like member having a main surface intersecting the travelling direction, the first member and the second member of each of the first blockers being symmetric with respect to a plane perpendicular to the travelling direction and having a travelling-direction spacing therebetween that increases along the inflow direction of the outside air.

2. The vehicular cooling device according to claim 1, wherein
the housing is provided vertically above a body of the vehicle, and
when the travelling direction is defined as a Y-axis direction and a vertical direction of the body is defined as a Z-axis direction, the opening includes an opening plane that is located on an outer side of the housing and inclined toward a ceiling side of the body with respect to a plane parallel to a YZ plane.

3. The vehicular cooling device according to claim 2, further comprising:
second blockers being plate-like members extending in the travelling direction and provided in the opening at positions closer to the air channel than the first blockers, the second blockers being spaced apart in the direction perpendicular to both of the travelling direction and the inflow direction of the outside air.

4. The vehicular cooling device according to claim 3, wherein a spacing between each of the second blockers and a surface of the opening located on a vertically lower side thereof increases along the inflow direction of the outside air.

5. The vehicular cooling device according to claim 2, wherein each of the first blockers has a cross-section perpendicular to a direction in which the first member extends, the cross-section has a V-shape formed by the first member and the second member, and the V-shape has a vertex angle greater than 60° and less than 150°.

6. The vehicular cooling device according to claim 2, wherein recessed portions in which each of the first blockers engages are formed in two surfaces on the inside of the opening, the two surfaces intersecting the direction in which the first member extends, and engagement of each of the first blockers in the recessed portions at both ends of each of the first blockers in the direction in which the first member extends fastens each of the first blockers in the opening.

7. The vehicular cooling device according to claim 2, further comprising:
third blockers provided in the opening at positions to block a flow path of the outside air that flows through the first blockers toward the air channel, the third blockers being spaced apart in the travelling direction,
wherein each of the third blockers extends in the direction perpendicular to both of the travelling direction and the inflow direction of the outside air, and includes a third member and a fourth member, the third member being a plate-like member having a main surface intersecting the travelling direction, the third member and the fourth member of each of the third blockers being symmetric with respect to a plane perpendicular to the travelling direction and having a travelling-direction spacing therebetween that decreases along the inflow direction of the outside air.

8. The vehicular cooling device according to claim 7, wherein a maximum spacing of the travelling-direction spacing between the third member and the fourth member is greater than a maximum spacing of the travelling-direction spacing between the first member and the second member.

9. The vehicular cooling device according to claim 1, further comprising:
second blockers being plate-like members extending in the travelling direction and provided in the opening at positions closer to the air channel than the first blockers, the second blockers being spaced apart in the direction perpendicular to both of the travelling direction and the inflow direction of the outside air.

10. The vehicular cooling device according to claim 9, wherein a spacing between each of the second blockers and a surface of the opening located on a vertically lower side thereof increases along the inflow direction of the outside air.

11. The vehicular cooling device according to claim 1, wherein each of the first blockers has a cross-section perpendicular to a direction in which the first member extends, the cross-section has a V-shape formed by the first member and the second member, and the V-shape has a vertex angle greater than 60° and less than 150°.

12. The vehicular cooling device according to claim 1, wherein recessed portions in which each of the first blockers engages are formed in two surfaces on the inside of the opening, the two surfaces intersecting the direction in which the first member extends, and engagement of each of the first blockers in the recessed portions at both ends of each of the first blockers in the direction in which the first member extends fastens each of the first blockers in the opening.

13. The vehicular cooling device according to claim 1, further comprising:
third blockers provided in the opening at positions to block a flow path of the outside air that flows through the first blockers toward the air channel, the third blockers being spaced apart in the travelling direction, wherein each of the third blockers extends in the direction perpendicular to both of the travelling direction and the inflow direction of the outside air, and includes a third member and a fourth member, the third member being a plate-like member having a main surface intersecting the travelling direction, the third member and the fourth member of each of the third blockers being symmetric with respect to a plane perpendicular to the travelling direction and having a travelling-direction spacing therebetween that decreases along the inflow direction of the outside air.

14. The vehicular cooling device according to claim 13, wherein a maximum spacing of the travelling-direction spacing between the third member and the fourth member is greater than a maximum spacing of the travelling-direction spacing between the first member and the second member.

15. The vehicular cooling device according to claim 13, wherein each of the first blockers has a cross-section perpendicular to a direction in which the first member extends, the cross-section has a V-shape formed by the first member and the second member, and the V-shape has a vertex angle greater than 60° and less than 150°, and each of the third blockers has a cross-section perpendicular to a direction in which the third member extends, the cross-section has a V-shape formed by the third member and the fourth member, and the V-shape has a vertex angle greater than 60° and less than 150°.

16. The vehicular cooling device according to claim 13, wherein first recessed portions in which each of the first blockers engages and second recessed portions in which each of the three blockers engages are formed in two surfaces on the inside of the opening, the two surfaces intersecting the direction in which the first member extends, and engagement of each of the first blockers in the first recessed portions at both ends of each of the first blockers in the direction in which the first member extends fastens each of the first blockers in the opening, and engagement of each of the third blockers in the second recessed portions at both ends of each of the third blockers in the direction in which the third member extends fastens each of the third blockers in the opening.

17. The vehicular cooling device according to claim 13, wherein a surface of the opening located on a vertically lower side thereof includes, in a region between the third member and the fourth member, a hole through which foreign objects contained in the outside air that flows into the opening are discharged.

18. The vehicular cooling device according to claim 1, wherein a shielding surface extending from a lower surface of the opening located on a vertically lower side thereof toward an upper surface thereof to block a portion of the opening on an air channel side thereof is formed in a region of connection between the opening and the air channel.

19. The vehicular cooling device according to claim 1, wherein a surface of the opening located on a vertically lower side thereof includes a hole through which foreign objects contained in the outside air that flows into the opening are discharged.

20. The vehicular cooling device according to claim 1, wherein the opening includes a vertically lower side having a thickness in the direction perpendicular to both of the travelling direction and the inflow direction of the outside air, the thickness being greater along the inflow direction of the outside air.

* * * * *